Nov. 14, 1933.　　　R. W. HILTON　　　1,935,293
CHARCOAL CAR
Filed Jan. 12, 1931　　　2 Sheets-Sheet 1
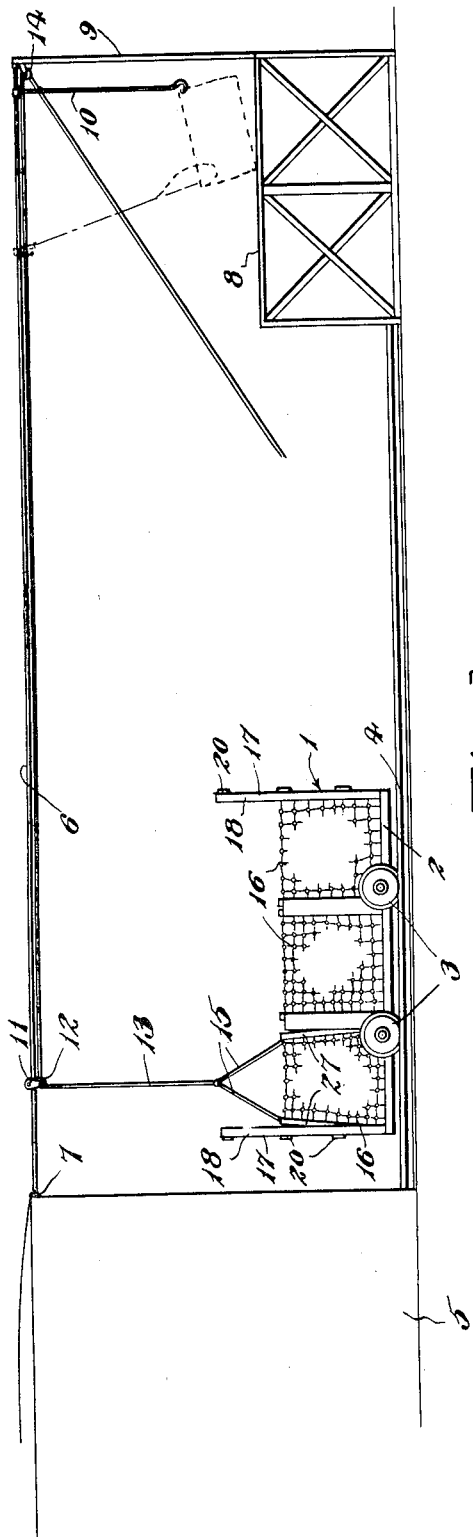
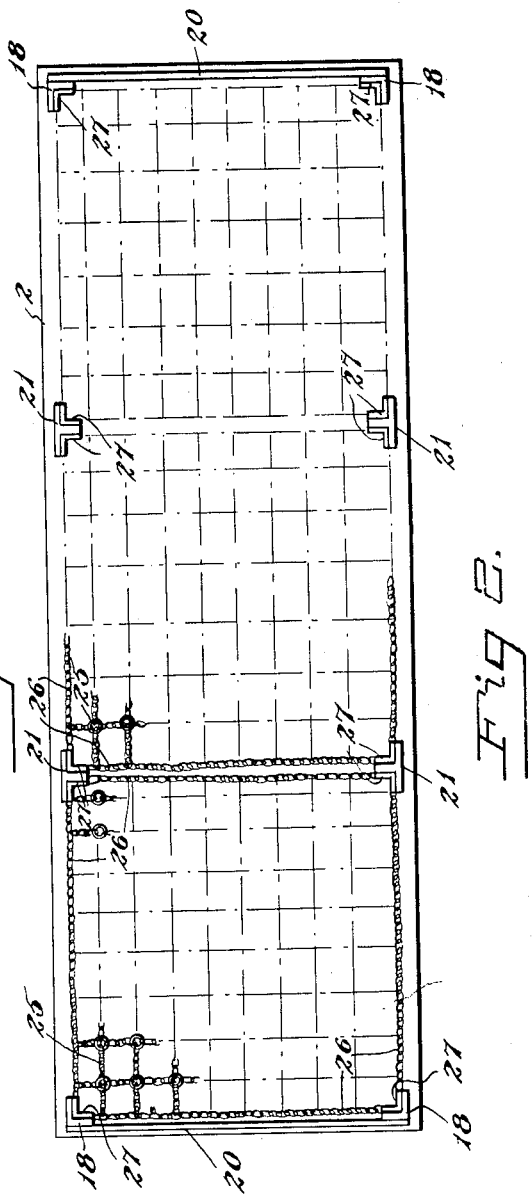
Inventor
R. W. Hilton
By Lacy & Lacy, Attorneys Nov. 14, 1933.   R. W. HILTON   1,935,293
CHARCOAL CAR
Filed Jan. 12, 1931   2 Sheets-Sheet 2
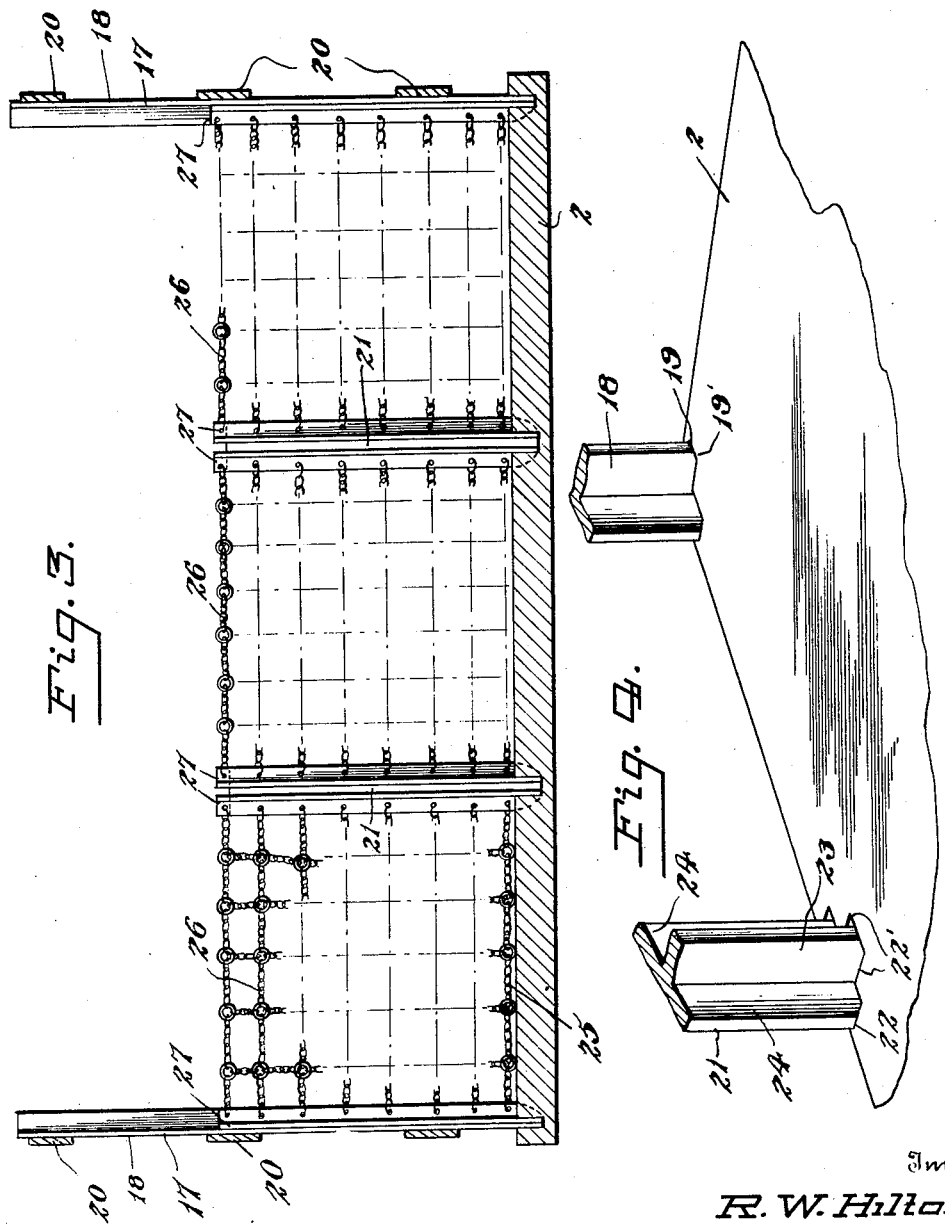
Inventor
R. W. Hilton
By Lacey & Lacey,
Attorneys Patented Nov. 14, 1933

1,935,293

UNITED STATES PATENT OFFICE 1,935,293

CHARCOAL CAR

Robert W. Hilton, Bradford, Pa., assignor to Mary Hilton, Bradford, Pa.

Application January 12, 1931. Serial No. 508,292

4 Claims. (Cl. 202—98)

This invention relates to charcoal apparatuses and more particularly to an improved charge carrier or car by means of which a load of wood to be reduced to charcoal may be moved into a furnace and extracted therefrom after the wood has been reduced to charcoal.

One object of the invention is to provide a charging car so constructed that baskets in which charcoal is to be conveyed may be supported in an upright position upon the charging car and retained in the upright position until removed.

Another object of the invention is to so form the baskets that while they will be flexible they will be prevented from collapsing when in place upon the platform of the charging car and at the same time allow the baskets to be easily lifted from the charging car and moved along an overhead cable to a loading platform or storage house.

Another object of the invention is to so form the baskets and the charging car that when loaded the wood may extend upwardly above the open upper ends of the baskets and as it is converted into charcoal settle until it is entirely contained in the baskets.

Another object of the invention is to provide baskets for this purpose which are simple in construction and very strong and durable and capable of withstanding hard usage.

Another object of the invention is to so form the baskets and the charging car that stakes extending upwardly from the platform of the car may so engage uprights or corner strips of the baskets that these uprights will be braced against outward pressure and relieved of strain which might cause them to be bent or prevented from easily moving out of sockets in the platform in which their lower ends are engaged when the baskets are lifted from the charging car.

The invention is illustrated in the accompanying drawings, wherein:

Figure 1 is a side elevation showing a charging car outside an oven and a basket about to be lifted therefrom and moved along an overhead cable to a loading platform.

Figure 2 is a top plan view of the improved charging car.

Figure 3 is a longitudinal sectional view through the charging car.

Figure 4 is a fragmentary perspective view showing a portion of the charging car platform and the lower portions of stakes carried thereby.

The charging car indicated in general by the numeral 1 has a platform 2 and wheels 3 which may be rotatably mounted in any desired manner and rest upon rails of a track 4 so that the car may be easily moved into or out of an oven or furnace located at 5 in which wood is to be converted into charcoal. An overhead cable 6 has one end attached to the furnace as shown at 7 and this cable has been shown extending over a loading platform 8 and attached to a support 9 but it is to be understood that it could extend into a storage house or to any other place where it may be desired to have the charcoal dumped. A hook 10 is secured upon the cable 6 over the platform 8 and upon the cable is slidably mounted a carriage 11. This carriage includes a pulley 12 about which is engaged a strong rope or thin flexible cable 13 which extends longitudinally beneath the cable 6 and after being engaged with the pulley 14 on the support 9 extends downwardly so that it may be grasped by an operator. The end of the cable engaged with the pulley 12 extends downwardly and at its lower end carries a grapple consisting of short ropes 15, preferably having hooks at their ends so that they may be engaged with corner portions of the baskets 16 carried by the charging car. It will thus be seen that after wood has been reduced to charcoal and the charging car moved outwardly from the furnace the baskets may be engaged at their corners and individually lifted from the charging car and moved along the suspension cable 6 to a position over the platform where the basket will be engaged with the hook 10 and caused to tilt and drop its load of charcoal upon the platform when pull upon the cable is released. Since the wood is loaded into baskets carried by the charging car, the charcoal when formed will be contained in baskets and thereby prevented from falling from the charging car when removed from the furnace. This also prevents loss while transferring the charcoal to the loading platform or storage house. It will be understood that a chute or screen for delivering the charcoal into a freight car or storage house could be substituted for the platform.

The charging car is provided with end walls 17 which are of greater height than the baskets thereby permitting a sufficient quantity of wood to be loaded when charging. Wood occupies more space than the resulting charcoal and therefore the load of cord wood used as charcoal stock must be piled higher than the baskets so that as the wood settles during its conversion into charcoal a sufficient quantity of wood will be present to cause the baskets to be filled when conversion of the wood into charcoal is completed. Each end wall consists of corner posts or stakes 18 formed of angle metal to provide side flanges extending at right angles to each other and these corner posts or stakes have their lower ends firmly seated in sockets 19 in the platform so that they will be retained in an upright position. Cross bars 20 extending between and secured to the corner posts complete the end walls of the charging car. The charging car also carries other stakes 21 spaced from each other longitudinally of the car and having their lower ends firmly engaged in sockets 22 formed near the side edges of the platform. These stakes 21 are formed of T bars thereby providing each stake with a web or flange 23 extending transversely of the car and portions 24 extending longitudinally of the car. It will be understood that as many stakes 21 as desired may be erected upon the platform of the charging car according to the number and the size of baskets to be used.

Each basket has an openwork body portion so that proper circulation may take place in the furnace to reduce wood to charcoal. The body is formed of rings and short chains after the manner in which cargo nets used for loading and unloading vessels are made, and the body has a bottom 25 from the margins of which extend side walls 26. At the corners of each basket are disposed bars 27 formed of angle metal to side portions of which chains of the side walls are attached and these corner bars extend downwardly below the bottom 25 and are adapted to fit in extensions 19' and 22' of the sockets 19 and 22. Therefore when the baskets are set in place upon the charging car, the corner pieces or bars 27 will be retained in an upright position, and since the corner pieces are formed of angle metal they will fit in close contacting engagement with the stakes 18 and 21 as shown in Fig. 2 where they will be firmly braced against outward movement and thereby prevented from being bent outwardly or caused to bind in the sockets. By this arrangement the corner pieces or bars of the baskets may be very easily drawn upwardly out of the sockets when the grapple has its cable 15 engaged with corner portions of the basket. Upper ends of the corner bars may be temporarily secured to the stakes in any manner desired in order to prevent them from tilting inwardly if found necessary. It will also be obvious that a single basket may be used which may be either flexible or of a rigid construction. Inasmuch as the corner pieces or bars 27 bear against the rigid uprights with their lower ends fitted into the adjacent sockets, said uprights will support the container when at rest in an upright position on the platform and act as guides for the container when the latter is being removed from said platform.

When this improved apparatus is in use the baskets are set in place upon the charging car with their corner strips engaged in the sockets of the car platform. Cord wood or other wood of a suitable size is then placed in the baskets and the load continued above the open upper ends of the baskets. The upper portion of the load is held in place by the end walls which project upwardly above the baskets. After the charging car has been loaded it is moved into the furnace where it remains until the wood has been converted into charcoal. During conversion of the wood into charcoal its bulk is reduced and the wood gradually settles in the basket. By properly loading the charging car the baskets will be full but not overflowing when the wood has been completely converted into charcoal. After the charcoal has been formed the charging car is withdrawn from the furnace and the baskets are then successively engaged by the grapple and after being lifted upwardly a sufficient height to clear the car are moved along the overhead cable 6 to a position over the platform where the baskets are engaged with the hook 10 and dumped. It will thus be seen that no charcoal is lost while in the furnace or during transportation from the charging car to the platform. This also permits a charging car to be very easily and quickly unloaded and charcoal transported from the charging car to a loading platform or storage house. It should be noted that since the wood is loaded in a number of containers it will be divided into sections, thereby causing a good circulation to be established and a better grade of charcoal formed.

What is claimed is:

1. The combination with a car, of a freely flexible charge supporting basket having horizontally spaced rigid vertical corners, and means on the car engaging the corners of the basket for removably supporting the basket in the said car.

2. In apparatus of the class described, a charge carrying structure having a platform, stakes extending upwardly from said platform adjacent edges thereof, sockets being formed in the platform, and a foraminous basket having flexible walls and uprights to support the walls, the lower ends of said uprights and the lower ends of the stakes being both removably engaged in said sockets and the uprights fitting to and being sustained by the stakes.

3. In apparatus of the class described, a charge carrying structure having a platform, sockets being formed in said platform near the edges thereof, stakes disposed upright with their lower ends engaged in said sockets, said stakes being formed of angle material to provide flanges, and a foraminous basket having flexible walls and uprights engaged by the walls, said uprights being formed of angle material and fitting against said stakes in flat contacting engagement with flanges thereof with their lower ends removably engaged in said sockets.

4. In an apparatus of the character described, a charge carrying structure, horizontally spaced rigid uprights carried by said structure, there being sockets formed in said structure adjacent the uprights, and a freely flexible removable container resting upon said structure and provided with rigid vertical corner pieces adapted to bear against the rigid uprights with their lower ends fitting in the sockets whereby the container would be retained in an upright position when at rest and guided by the uprights when being removed from said structure.

ROBERT W. HILTON. [L. S.]